2,871,021

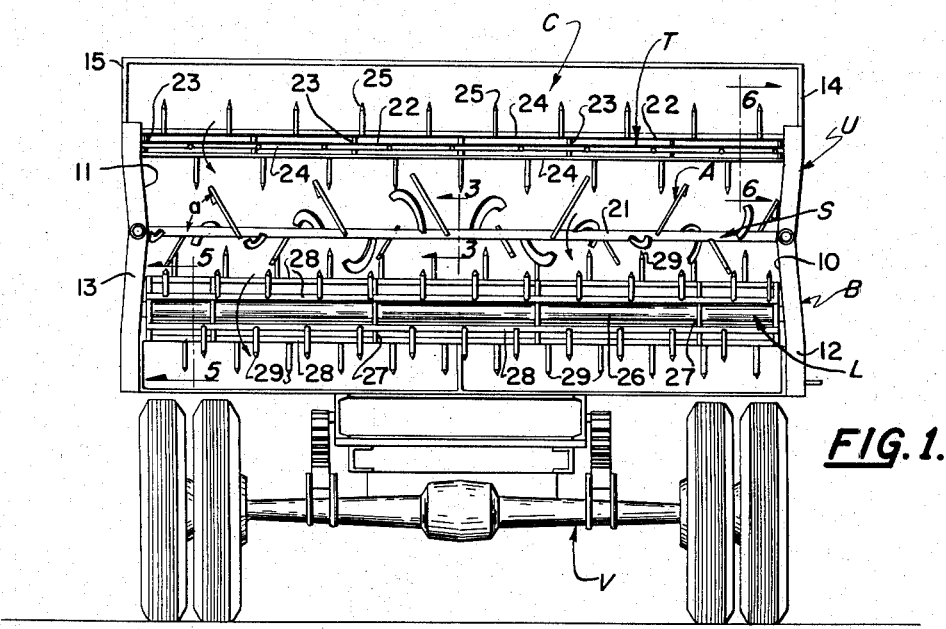
FIG. 1.
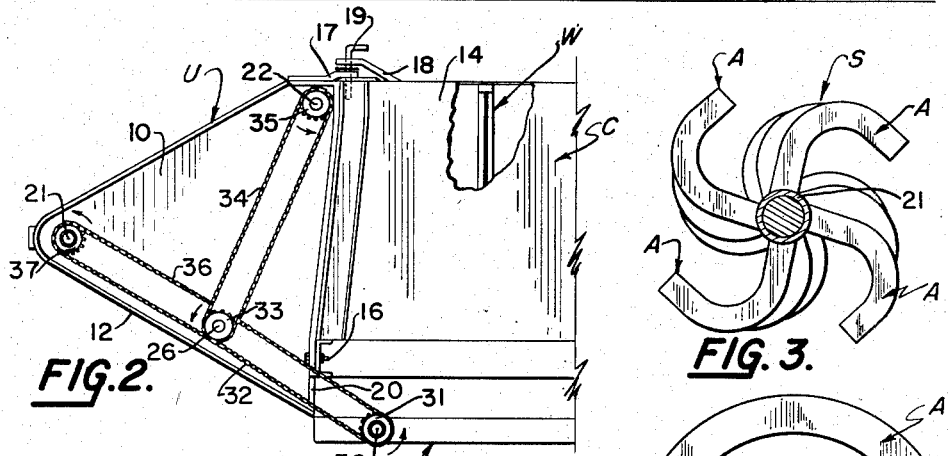
FIG. 2.
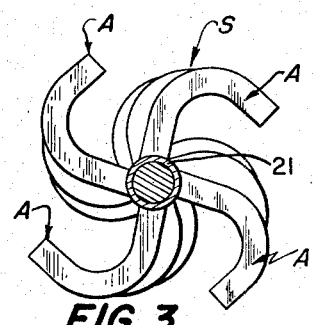
FIG. 3.
FIG. 4.
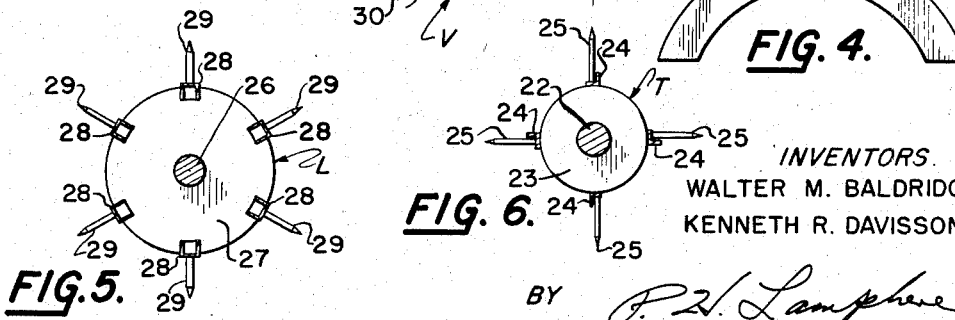
FIG. 5.
FIG. 6.
INVENTORS.
WALTER M. BALDRIDGE
KENNETH R. DAVISSON
BY P. V. Lamphere
ATTORNEY

United States Patent Office 2,871,021
Patented Jan. 27, 1959

SPREADER UNIT FOR TRUCK BODIES

Walter M. Baldridge and Kenneth R. Davisson,
Severance, Colo.

Application December 9, 1953, Serial No. 397,359

1 Claim. (Cl. 275—6)

Our invention relates to spreaders for certain material such as, for example fertilizer in the form of manure and is shown as embodied in a detachable unit for the end of a vehicle body, but may be otherwise embodied as desired.

One of the objects of our invention is to produce an improved spreader apparatus in which is embodied an improved rotatable spreading member producing a more efficient and uniform spreading action of the material being handled.

A further object is to produce a rotatable spreading member employing a rotatable shaft having a plurality of spaced apart curved arms thereon so shaped and mounted that an extra wide and uniform spreading of material will be accomplished along the line of travel of the vehicle on which the spreading member is mounted.

A still further object is to produce a rotatable spreading member comprising a rotatable shaft carrying curved spreading arms, with the arms being mounted on the shaft in different relation thereto on different portions of the shaft to thereby produce improved spreading of material.

Yet another object of our invention is to produce an improved rotatable spreading member together with improved means for feeding the material thereto to be spread.

A further object is to produce an improved spreader unit which can be quickly and easily attached to the rear end of a truck body having power unloading apparatus so that efficient spreading of loaded material can be accomplished whenever desired without the necessity of having a complete spreading vehicle especially designed for such use only.

Other objects of our invention will become apparent from the following description taken in connection with the accompanying drawings in which:

Figure 1 is a rear view of a spreading apparatus shown by way of example as embodying our invention, said apparatus being designed as an attachment unit for the rear end of a truck body having a power unloading apparatus;

Figure 2 is a side view of the unit showing the driving arrangement for the spreader shaft and the feeder shafts;

Figure 3 is a sectional view taken on the line 3—3 of Figure 1 showing an end view of one portion of the spreader shaft;

Figure 4 is a side view of a spreader arm before attachment;

Figures 5 and 6 are sectional views taken on the lines 5—5 and 6—6, respectively, of Figure 1 showing details of the two pronged rotatable feeder members for the rotatable spreader.

Referring to the drawings in detail and first to Figures 1 and 2, our unit for ready attachment and detachment from a vehicle body is generally indicated by the letter U, it being shown associated wiht the rear end of a compartment C carried by a chassis of a vehicle such as a truck V. Our unit as shown comprises a body structure B in which is mounted the rotatable spreader member S and the two top and lower rotatable pronged feeder members T and L.

The body structure B of our unit U has triangular side frames 10 and 11 which are provided with flanges 12 and 13 for strengthening purposes. The side frames are spaced apart the same distance as the sides 14 and 15 of the compartment C of the vehicle so they can be attached and detached therefrom. The bottom portions of the side frames are arranged to be attached by the bolts 16 to the ends of the compartment sides and at the tops of the side frames there are provided perforated forwardly projecting plates 17 to be received between the top of a compartment side and a spaced perforated plate 18. A removable pin 19 is arranged to make the attachment at the top of the unit, said pin extending through the hole in plate 19, the received plate 17 carried by the unit and into the top of the compartment. Thus, the unit can be easily attached and detached by the bolts 16 and pins 19. The side frames of the unit are attached together by a cross frame member 20 which will fit up against the end surface of the bottom of the vehicle compartment as shown.

The most important feature of our unit is the rotatable spreader member S. This is of special construction comprising a shaft 21 suitably journaled in the side frames 10 and 11 at the rear apex ends thereof as shown. The spreader shaft has atttached thereto, as by welding, a plurality of curved spreading arms or blades A. The arms are of special shape and construction and mounted on the shaft in a particular manner. On one side of the center of the shaft the arms have one arrangement and on the other side a complementary arrangement. Each arm is made from a flat piece of straight stock of uniform thickness and width. After a predetermined length of the stock is cut off the arm is curved in the direction of its width and suitably acted on in a press so that the arm in its curved condition still lies in a single plane, as can be seen from viewing certain arms in Figure 1. As shown in the preferred form the arm is circular, with the radius of curvature of the outer surface being approximately 3⅞ inches. The thickness is 3/16 of an inch and the width is approximately 1¼ inches.

As can be seen from the rear of the unit, all the arms on the left half of the shaft 21 are attached thereto so as to have their outer ends tilted or leaning toward the left frame side 11 and in a similar manner the arms on the right half of the shaft are also tilted or leaning, but in the opposite direction toward the right frame side 10. The angle of tilt with respect to the shaft axis is preferably between 20 and 40 degrees, as indicated by "$a$" in the drawing. We have found that a preferred angle is approximately 30 degrees.

The arms also have a special arrangement along the shaft. The arms are spaced about 3 inches apart (thus making four to the foot) and are attached so a forward (direction of rotation) spiral condition exists for each fourth arm, as can be seen from Figure 3. If the left half of the shaft is considered, as shown, there are twelve tilted arms. The first four arms are attached around the shaft approximately 90 degrees apart as progression is made from the center of the shaft toward the end. The fifth arm, instead of being attached in axial alignment with the first arm, is shifted to be a few degrees out of line, a preferred shaft being about 30 degrees. Similarly, the fifth arm is shifted out of axial alignment with respect to the second arm. This shifting of every fourth arm thus produces the spiral arrangement desired. Other arrangements can be made to have the arms out of axial alignment. A similar attaching arrangement is made on the right half of the shaft. This arrangement, or an equivalent arrangement, of the arms on each half of the shaft assures highly efficient distribution or spreading of the material, such as fertilizer, from the compartment. Not only is the material given a uniform spreading during distribution, but a wide spreading is accomplished for a considerable distance on each side of the vehicle as it moves across a field. Furthermore, there is no overlapping along the center line of movement of the vehicle.

On the unit there is mounted the previously referred to feeder member T which is at the top of the unit above the spreader member S and closely adjacent the point of attachment of the unit to the upper part of the compartment C. This feeder member T has a shaft 22 journaled at its ends in the side frames 10 and 11. Spaced along the shaft and suitably secured thereto are discs 23 which have mounted at their periphery the L-shaped angle irons 24 extending parallel with the shaft. As shown, there are four angle irons 24 spaced 90 degrees apart and secured as by welding to these angle irons are the outwardly extending feeder spikes 25. These spikes are so spaced longitudinally along the four angle irons that there will be a staggered relation of the spikes, as can be readily seen in Figure 1. The purpose of the feeder member T is to control the movement of the top portion of the material as it is feed toward the spreader member S from the compartment C in any desired manner as, for example, by a pushing wall W in the compartment C moving rearwardly to push the material toward the rear end thereof or by a rearwardly traveling floor, all of which is common practice.

In addition to the top feeder member T, we provide the lower feeder member L which is between the spreader member S and the compartment and at the bottom of the unit. This feeder member L comprises a shaft 26 carrying a plurality of longitudinally spaced discs 27 thereon. Attached to the periphery of these discs are six longitudinally extending U-shaped angle irons 28 equally spaced as shown. These irons carry outwardly projecting feeder spikes 29 suitably welded thereto. The spikes are so spaced as to have a staggered relation as shown. The purpose of the feeder member L is to feed the material coming from the compartment upwardly and onto the arms of the spreader member.

The direction of rotation of the spreader member S and the feeder members is such as to bring about a proper feeding of the material from the compartment C to the spreader and then action by the spreader to accomplish efficient distribution. The directions of rotation of all the shafts involved are shown by arrows in Figure 2. These directions of rotation are accomplished by chain drives from a single drive shaft suitably journaled at the rear of the vehicle body V and driven in any desired manner. The shaft 30 has a rotation in the direction indicated by the arrow in Figure 2. On the shaft 30 is a sprocket 31 and an endless chain 32 connects this sprocket to drive a sprocket 33 on the outer end of the lower feeder shaft 26 to thus cause the shaft to have a counter clockwise rotation as indicated. Thus, when material is forced out of the compartment C, it will be lifted over the top of the feeder L by its spikes into the spreader S.

The end of the shaft of the lower feeder member L inwardly of the sprocket 33 has mounted thereon two other similar sprockets (not shown). One of these sprockets drives an endless chain 34 connected by a sprocket 35 on shaft 22 of the top feeder member T. The other of these not shown sprockets drives an endless chain 36 connected by a sprocket 37 to drive the shaft 21 of the spreader member S. It will be noted that the directions of rotation of all the shafts, as viewed in Figure 2, are counter clockwise and this direction of the spreader shaft causes the curved arms to rotate with their outer ends trailing.

The lower feeder member L is of larger diameter than the top feeder member T. Thus, the former picks up a considerable quantity of material coming from the compartment and throws it onto the rotating arms of the spreader member where it is given a further rearward throw and, because of the arrangement and construction of the arms, the material is at the same time given a good "fanned out" distribution. The upper feeder member, because of its direction of rotation, tends to hold the top of the material coming from the compartment from moving in too great a volume onto the spreader arms.

It will be noted that our unit is self-contained. It can be easily attached to the open rear end of a vehicle compartment which has any kind of rearward feeding floor or movable end gate so that material therein can be fed out of its rear end. When the unit is removed, the truck can be used for other purposes. An efficient spreading job is accomplished by the spreader member S and with the two feeder members it will receive the material to be spread in the most desirable manner. Although the unit is shown as detachable on the end of a vehicle compartment by way of example, it is to be understood that all the spreading and feeding means can be a permanent part of the rear end of the compartment if such should be desired.

Thus, being aware of modifications in the particular structure shown by way of example, all without departing from the fundamental principles of our invention, we desire it to be understood that the scope of the invention is not to be limited except in accordance with the terms of the appended claim and equivalents thereof.

What is claimed is:

A widespread material spreader for a scattering unloader, comprising a rotatable shaft having arms mounted thereon, said arms being axially spaced along and at different points around the shaft, each arm having a free end and an end integrally mounted on the shaft, each arm being made of relatively flat stock and of substantially uniform width and thickness and being curved from the shaft outwardly and tilted at an angle with a plane arranged transversely and passing vertically through the shaft so that the free end of each arm is some distance from the shaft and also displaced longitudinally along the shaft from the attached end, the arms on a portion of said shaft being tiltably mounted toward one end of the shaft and the arms on another portion of the shaft being tiltably mounted toward the other end of the shaft and the free ends of the arms being arranged to trail the attached ends when the shaft is rotated.

References Cited in the file of this patent
UNITED STATES PATENTS

| | | |
|---|---|---|
| 1,328,618 | Cook | Jan. 20, 1920 |
| 2,239,448 | Selhorst | Apr. 22, 1941 |
| 2,410,953 | Messenger et al. | Nov. 12, 1946 |
| 2,523,994 | McCloy | Sept. 26, 1950 |
| 2,605,106 | Gilmore | July 29, 1952 |
| 2,621,934 | Atkinson | Dec. 16, 1952 |
| 2,653,028 | Templeton | Sept. 22, 1953 |
| 2,696,977 | Baldridge et al. | Dec. 14, 1954 |
| 2,754,126 | Aune | July 10, 1956 |

FOREIGN PATENTS

| | | |
|---|---|---|
| 282,798 | Germany | Mar. 20, 1915 |